United States Patent
Chiu

(10) Patent No.: US 8,646,204 B2
(45) Date of Patent: Feb. 11, 2014

(54) CAPTURE CAGE

(76) Inventor: Fu Chuan Chiu, Yunlin Hsien (TW)

( * ) Notice: Subject to any disclaimer, the term of this patent is extended or adjusted under 35 U.S.C. 154(b) by 257 days.

(21) Appl. No.: 13/013,075

(22) Filed: Jan. 25, 2011

(65) Prior Publication Data

US 2011/0179693 A1  Jul. 28, 2011

(30) Foreign Application Priority Data

Jan. 26, 2010 (TW) .................................. 99102161
Jan. 26, 2010 (TW) .................................. 99102166

(51) Int. Cl.
*A01M 23/00* (2006.01)
(52) U.S. Cl.
USPC .............................. 43/61; 43/60; 43/67; 43/58
(58) Field of Classification Search
USPC ............................................ 43/58, 60, 61, 67
IPC .................................. A01M 23/16,23/18, 23/20
See application file for complete search history.

(56) References Cited

U.S. PATENT DOCUMENTS

| 383,972 | A | * | 6/1888 | Mittler | 43/61 |
| 1,444,934 | A | * | 2/1923 | Miller | 43/61 |
| 1,765,081 | A | * | 6/1930 | Lee | 43/61 |
| 2,573,228 | A | * | 10/1951 | Slauth | 43/61 |
| 2,725,661 | A | * | 12/1955 | Bowman | 43/61 |
| 4,546,568 | A | * | 10/1985 | Seyler | 43/61 |
| 4,873,785 | A | * | 10/1989 | Lai | 43/61 |
| 7,596,902 | B2 | * | 10/2009 | Han et al. | 43/61 |
| 2003/0014902 | A1 | * | 1/2003 | Draper | 43/62 |
| 2008/0282600 | A1 | * | 11/2008 | Rich et al. | 43/61 |

FOREIGN PATENT DOCUMENTS

| TW | 161334 | 6/1991 |
| TW | 205138 | 5/1993 |
| TW | 243608 | 3/1995 |
| TW | 283303 | 8/1996 |
| TW | M356387 | 5/2009 |

* cited by examiner

*Primary Examiner* — Daniel J Troy
*Assistant Examiner* — George Andonyan
(74) *Attorney, Agent, or Firm* — Guice Patents PLLC

(57) ABSTRACT

A capture cage includes a cage structure with a cage door, a pedal pivotally connected in the cage structure, a rotation member moving with the pedal, a suppression member located adjacent to an operation rod, and an induction lever pivotally connected to a top face of the cage structure. When the cage door is open, an inducible member of the cage door is confined by the inductive lever; the induction lever is restrained by the suppression member and is located adjacent to a head portion of the operation rod; and the pedal is suspended when the rotation member is supported by the operation rod. When the pedal is tilted, the rotation member separates from the operation rod; the head portion of the operation rod pushes the induction lever away from the suppression member and the operation rod moves downwardly; and the inducible member is released and the cage door closes.

20 Claims, 18 Drawing Sheets

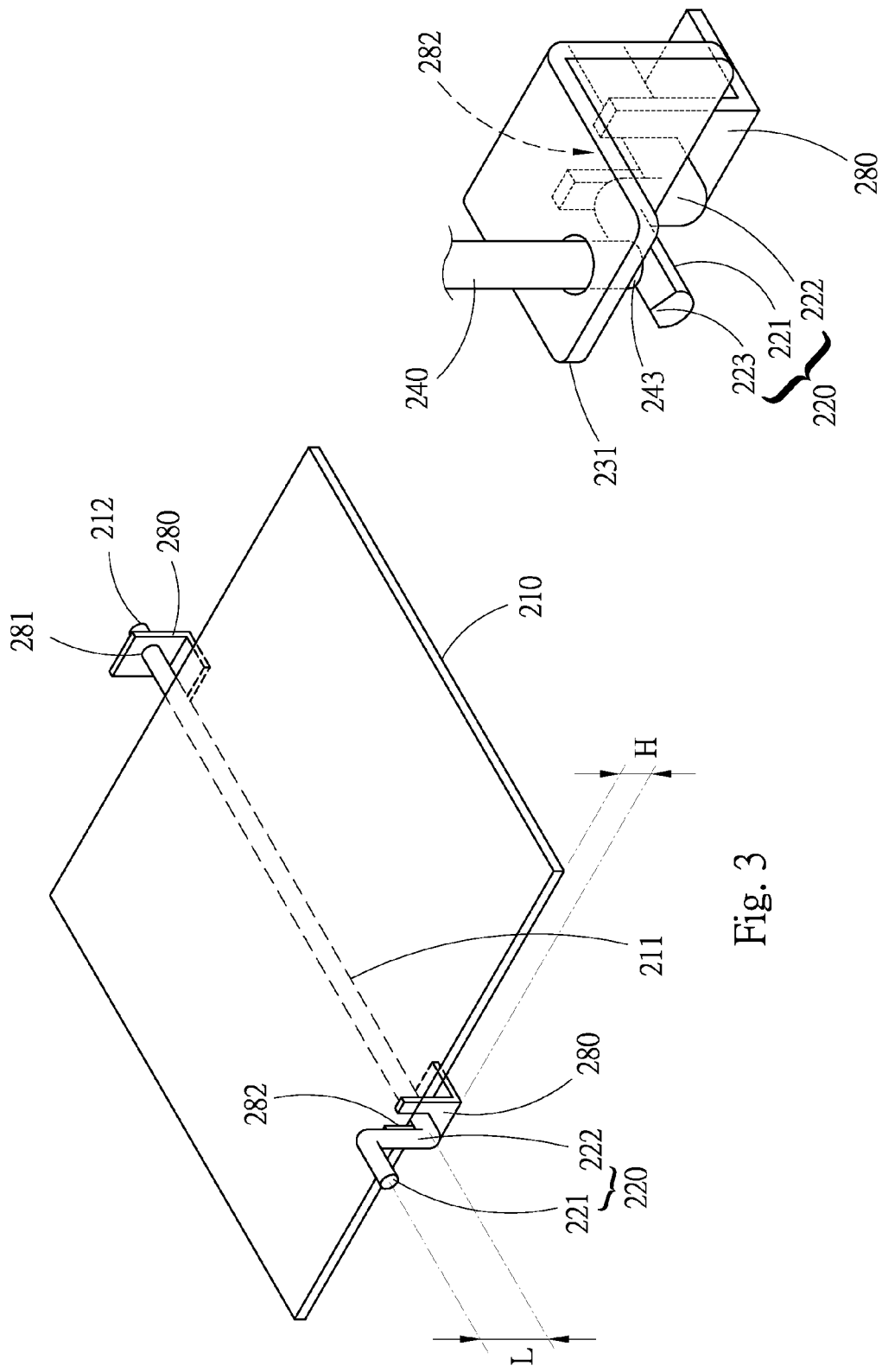

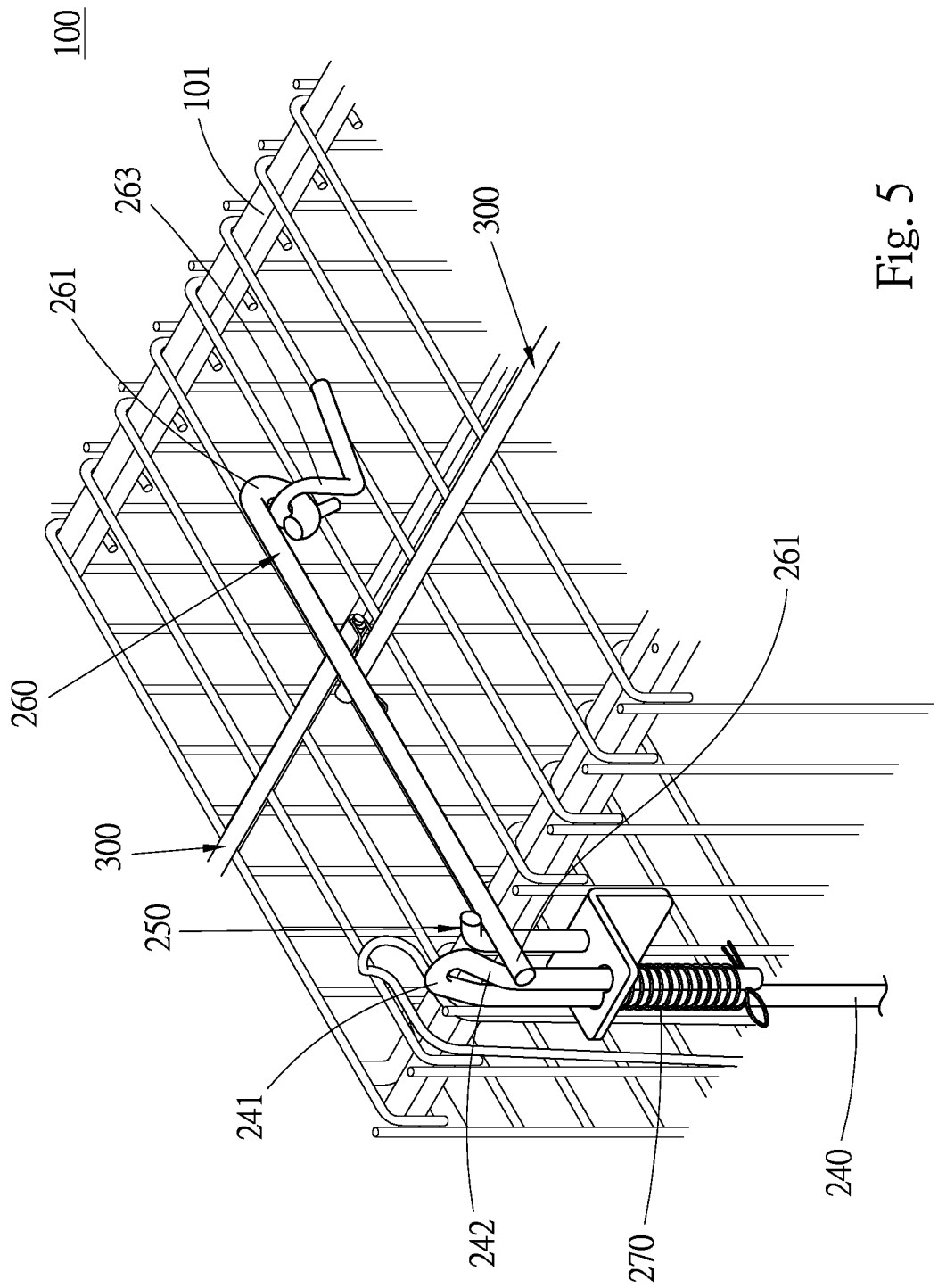

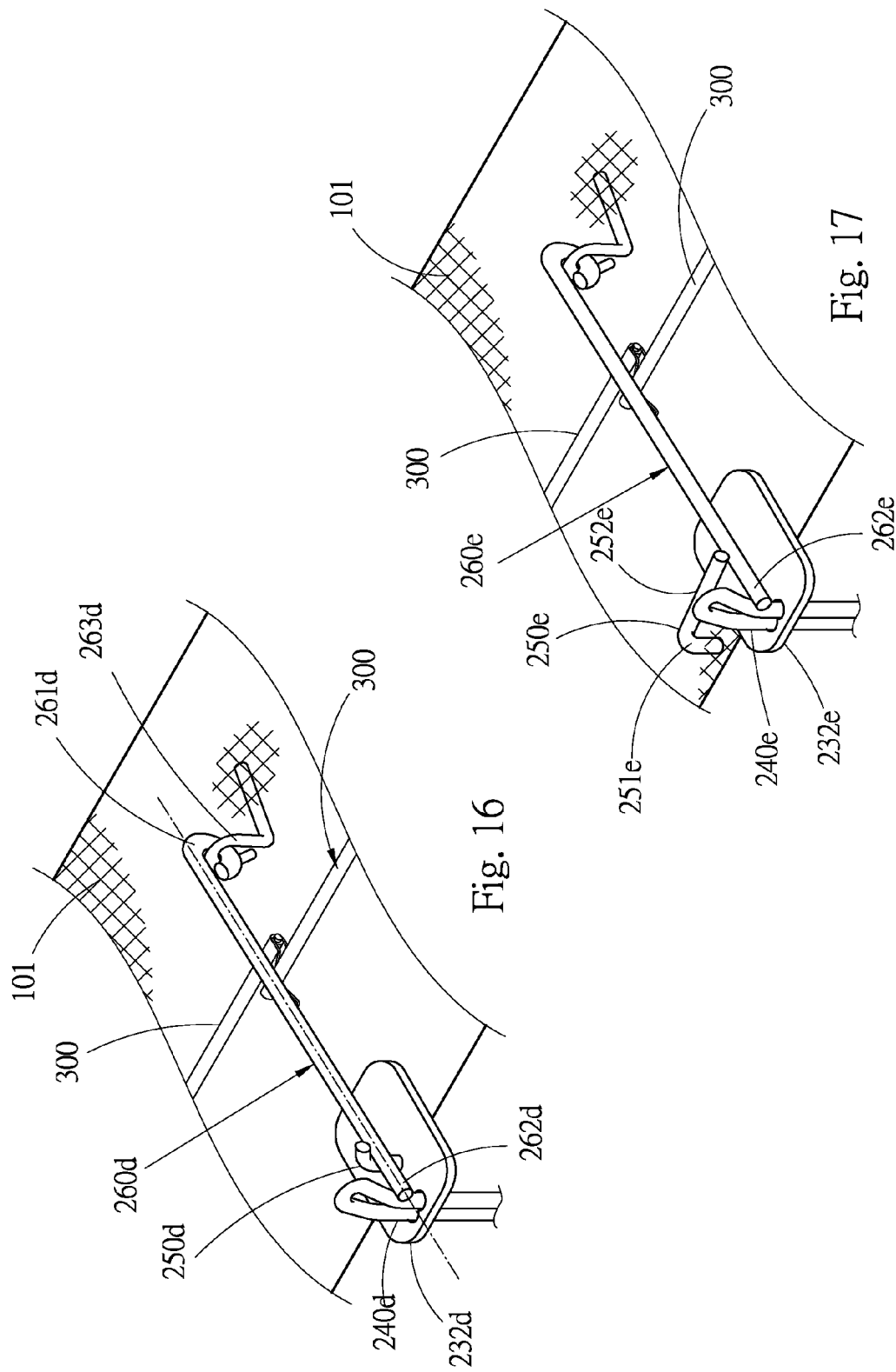

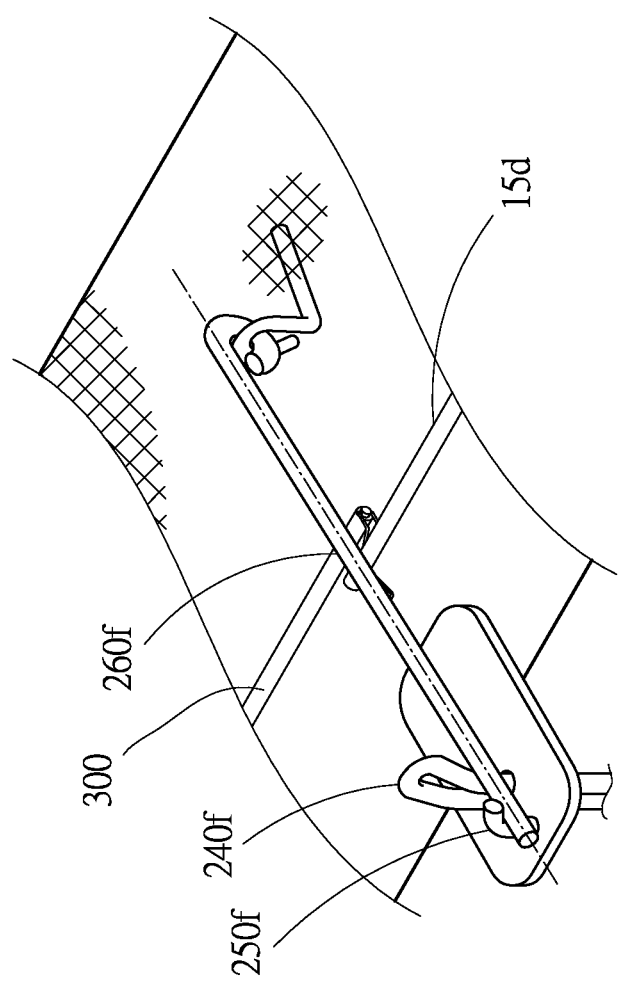

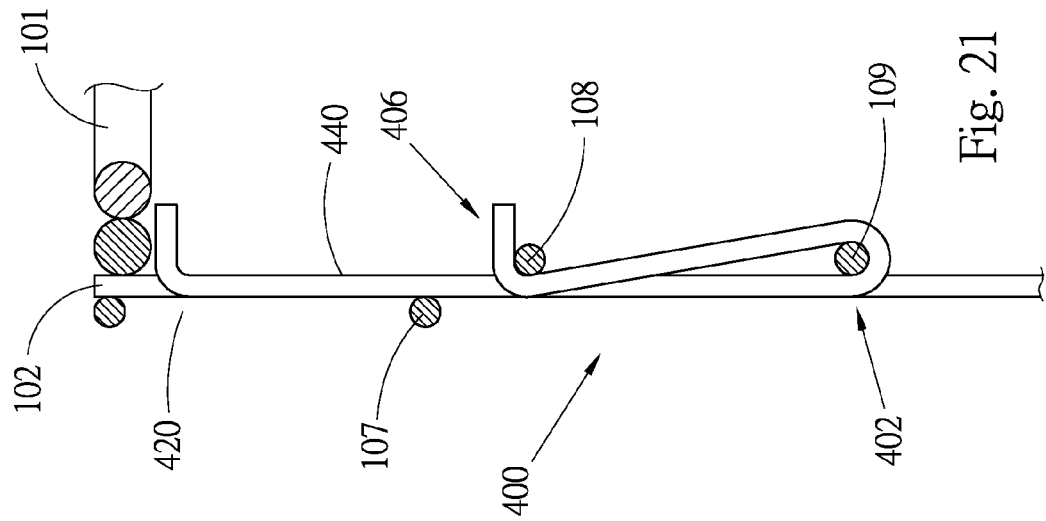
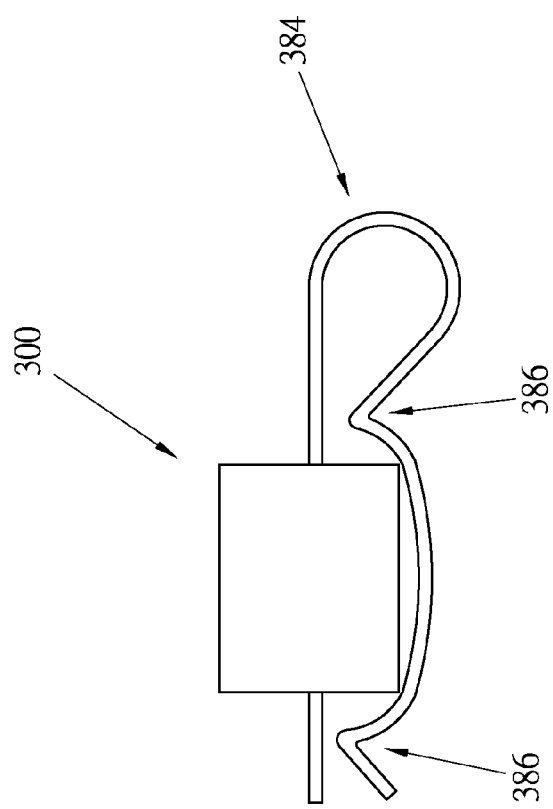

CAPTURE CAGE

BACKGROUND OF THE INVENTION

1. Field of the Invention

The present invention relates generally to a capture cage, and more particularly to a cage structure, which is capable of highly sense of slight off-balance.

2. Description of the Related Art

A conventional cage, such as rat cage, is set with bait to attract the rats, and the rat or the rats are caught while touching the trap mechanism. Please referring to Taiwan Patent Publication No 205138, Patent No 082371, entitled "Rat Cage with Instant Trap Mechanism", Taiwan Patent Publication No 243608, Patent No 099673, entitled "Improved Rat Cage", and Taiwan Patent Publication No 161334, Patent No 064571, entitled "Rat Cage with Slight Sense of Trap Mechanism", the bait is set though. However, if the bait is not pulled or is not appropriately pulled, the trap mechanism still not works and fails to confine the rats.

With respect to Taiwan Patent Publication No 283303, Patent No 116566, entitled "Double Door Cage without Bait", there is friction between a flat lever E1 and a pedal bar K for resisting against each other. The animal could be confined while stepping on a pedal, which is connected to the pedal bar K. The weight of the animal should be greater than the friction between the flat lever E1 and the pedal bar K, otherwise, the trap mechanism would not work. However, to adapt for the insufficient weight of animal, the friction should keep as low as possible. The under friction may be lower than that weight of the pedal and leads to automatic trap process without animals.

A lift door is usually applied to the conventional cage. With respect to Taiwan Patent No M356387, entitled "Combined Rat Cage", a handle is set on the lift door and is for enclosure by a resilient member. The handle is set to co-work with the trap mechanism, and the lift door encloses the cage due to the elastic energy while the triggered by animals or birds. However, after the conventional lift door encloses the cage, the beasts or the big animals the like would struggle to damage the door for getting out. The conventional cage lacking of latch mechanism fails to guarantee the keep of the animals. In addition, the handle takes more space for rotation, which is inconvenient for users.

To conclusion, the conventional cages are of poor capture effects.

SUMMARY OF THE INVENTION

It is therefore a primary object of the present invention to provide a capture cage, applied with the leverage principle and coaxial rotation, being capable of highly sense of slight off-balance. The highly sense of slight off-balance of the capture cage is kept by opening the cage door, which is triggered by touching a pedal for confining animals therein. The problems of capture difficulties due to insufficient force, such as underweight animals or inappropriate catch of bail, are prevented thereby.

It is therefore a respective object of the present invention to provide a capture cage, in which the cage door latches with the cage structure in seconds to prevent from escape of the animals.

It is therefore a respective object of the present invention to provide a capture cage, in which the bolt component could be withdrawn in the cage door while enclosure. It takes less volume occupation during the capture process than the prior art and is benefit of delivery due to the reduced space after capture.

It is therefore a respective object of the present invention to provide a capture cage, in which the cage door is of guiding function for highly precision and efficiency of enclosure.

It is therefore a respective object of the present invention to provide a capture cage, which is advantaged of economic costs due to easy install and simple structure.

To achieve the above object, a capture cage is offered. The capture cage includes a cage structure with a cage door, a pedal pivotally connected in the cage structure, a rotation member being of angular displacement same as the pedal, an operation rod supported by the rotation member, a suppression member being adjacent to the operation rod, and an induction lever pivotally connected to the a top face of the cage structure. When the cage door is open, an inducible member of the cage door is confined by the inductive lever; the induction lever is restrained by the suppression member and corresponds to a head portion of the operation rod. The pedal keeps in suspension while the rotation member supports the operation rod. When the pedal is tilted, the rotation member moves away from the operation rod. The head portion of the operation rod pushes the induction lever away from the suppression member while the operation rod moves downwardly. The inducible member is released thereby and the cage door encloses the cage structure correspondingly.

The cage structure has a latch portion formed of a bottom edge at the opening thereof; the cage door defines a chute formed at an outer face thereof in an up-and-down manner; the inducible member is a bolt component, which arranged through and slides in the chute; a bottom end of the bolt component is restrained in the chute as the bolt component slides outwards from a top end of the chute; whereby the bolt component is withdrawn in the chute until to bolt into the latch portion of the cage structure so that the cage door latches to the cage structure.

The cage door includes two lateral guides extending two lateral sides thereof and being symmetrical; so that the lateral guides simultaneously touch the two side faces of the cage structure for the chute aligning with the latch portion of the cage structure as the cage door encloses the cage structure.

The present invention can be best understood through the following description and accompanying drawings, wherein:

BRIEF DESCRIPTION OF THE DRAWINGS

FIG. 3 is a perspective view of the pedal according to FIG. 1;

FIG. 4 is an enlarged perspective view of FIG. 3;

FIG. 5 is an enlarged perspective view of FIG. 1;

FIGS. 16 to 19 are enlarged perspective view illustrating various arrangements of the operation rod, suppression member and limit fulcrum according to the present invention;

FIG. 21 is a side view illustrating a buckle member according to the present invention;

FIG. 22 is a top view of the obstruction portion of the bolt component according to the present invention.

DETAILED DESCRIPTION OF THE PREFERRED EMBODIMENTS

Figure 1:
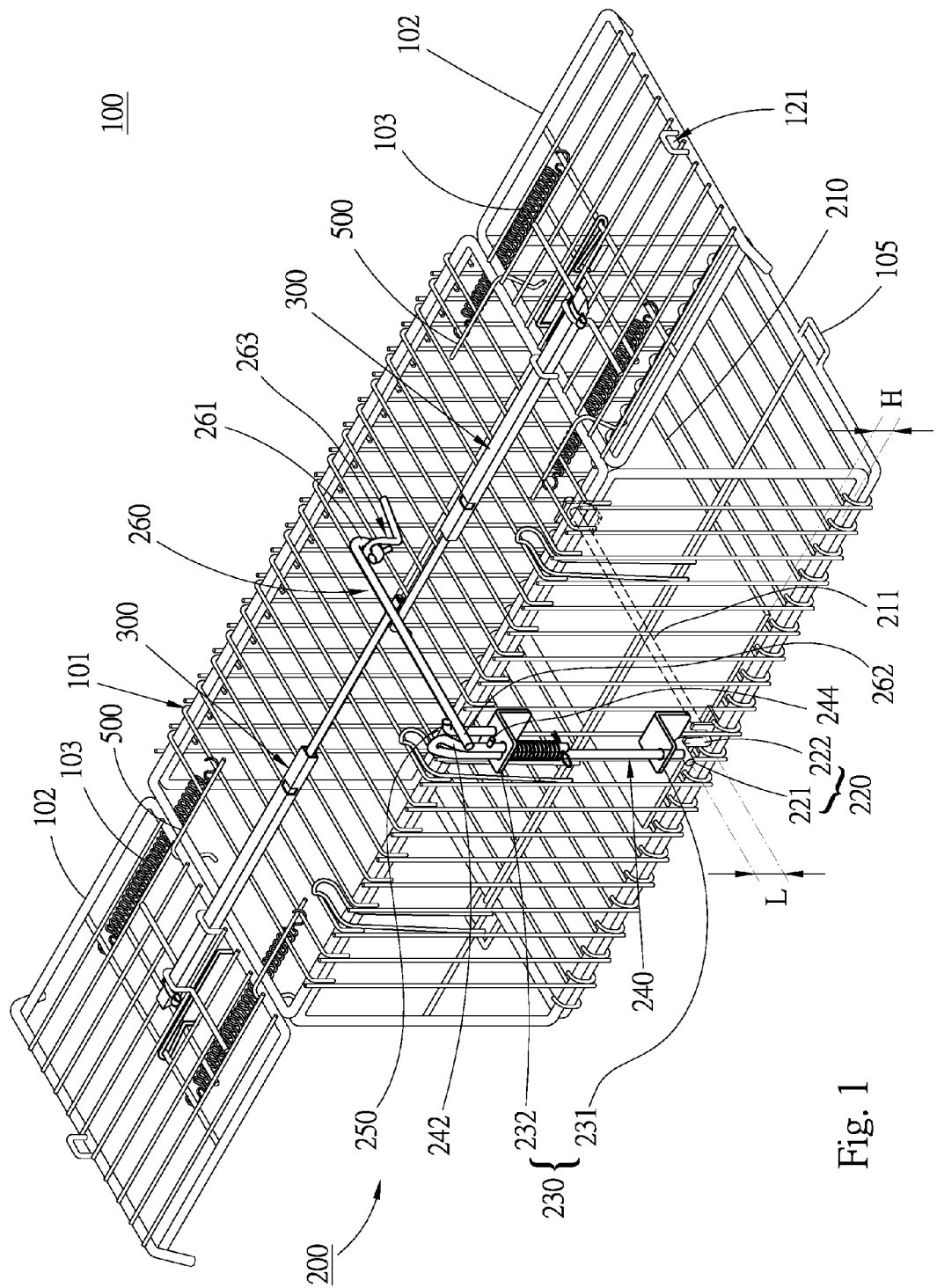
FIG. 1 is a perspective view illustrating a capture cage in previous status according to a preferable embodiment of the present invention.

Please refer to FIG. 1, a capture cage structure 100 before capture of a first preferred embodiment of the present invention is illustrated. The cage structure 100 includes a cage structure 101, at least one cage door 102, means for operation 200, and at least one inducible member or bolt component 300.

The cage structure 101 defines at least one end thereof and an opening formed at the end. Each opening defines a top edge and a bottom edge, a latch portion 105 is disposed at the bottom edge. In this embodiment, the latch portion is U-shaped and defines a through passage.

Figure 10:
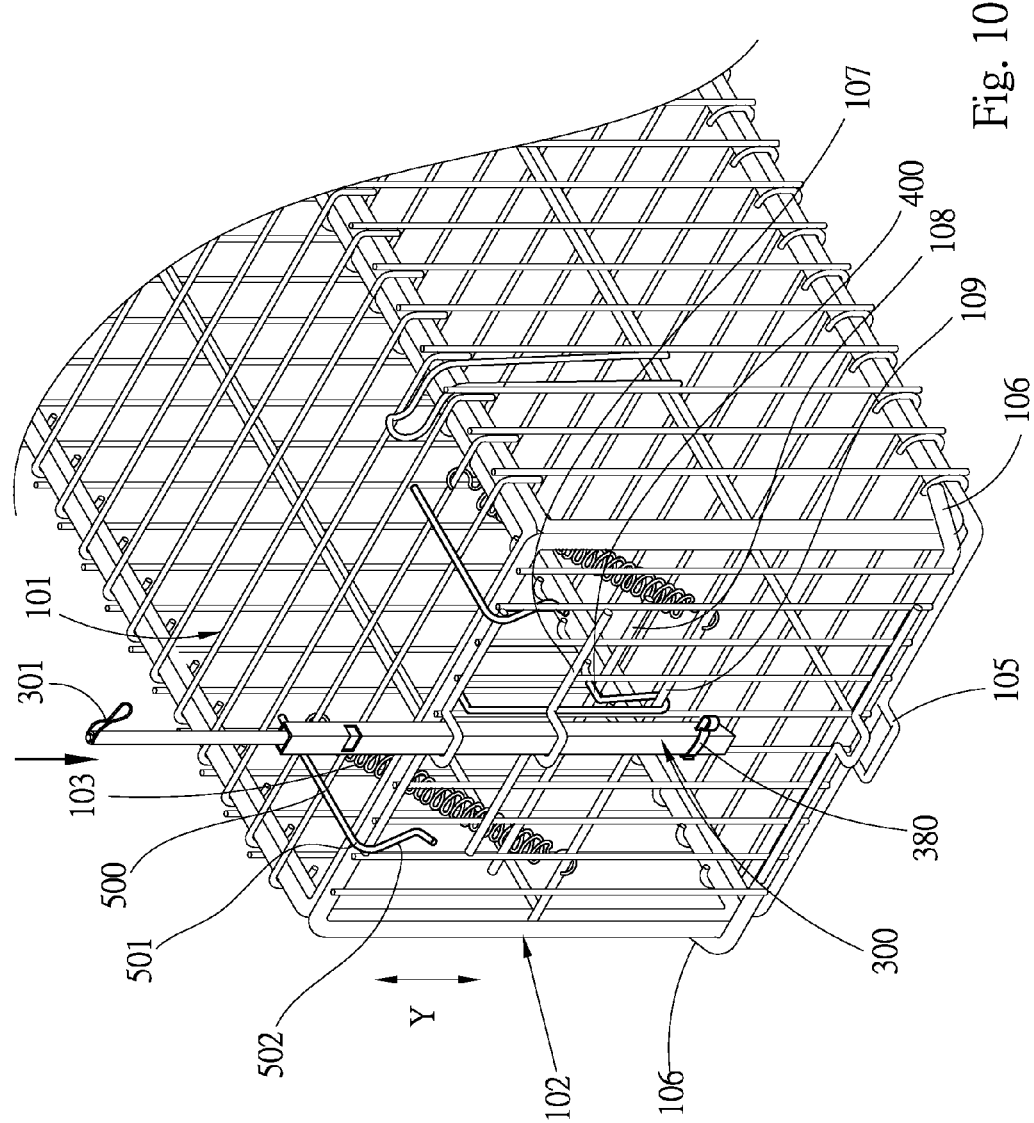
FIG. 10 is a perspective view illustrating the bolt component withdrawing into the cage door according to FIG. 1.

A top edge of the cage door 102 pivotally connected to the top edge of the opening for opening or enclosing the cage structure 101. The pivotal connection between cage door 102 and the cage structure 101 could be hinge structure or the like, which is good for lifting the cage door 102. In this embodiment, there are two clasping members 500 applied to the top edge of the opening of the cage structure 101. Each clasping member 500, as in inn FIG. 10, is wave-liked and includes an engagement portion 501 and a guiding portion 502. The engagement portion 501 bends from the cage structure 101 with an inclined angle towards the cage door 102 to surround the top edge of the cage door 102. The guiding portion 502 is arranged at an inner side of cage door 102 and smoothly connected to the engagement portion 501. The cage door 102 defines several penetration portions to correspond to the clasping members 500 and allow the clasping members 500 penetrate through. Therefore, the top edge of the cage door 102 slides along the guiding portion 502 near the top edge of the cage structure 101 and further stops at the engagement portion 501, so that the cage door 102 joins to the cage structure 101 and could be lifted.

The configuration of the inducible member or bolt component 300 is not restrained. The inducible member or bolt component 300 is designed on the cage door 102 for dragging the cage door 102 to enclose or disclose the cage structure 101. In this embodiment, the cage door 102 includes a rack member 120 at the outer face thereof, and the rack member 120 defines a chute 121 penetrating longitudinally in an up-and-down manner. The inducible member 300 is pole-like, called the bolt component or bolt component 300 hereafter. The bolt component 300 is arranged through and slides in the chute 121; a bottom end of the bolt component 300 is restrained in the chute 121 as the bolt component 300 slides outwards from a top end of the chute 121.

The means for operation 200 includes a pedal 210, a rotation member 220, a restriction component 230, an operation rod 240, a suppression member 250, an induction lever 260 and a resilient member 270.

Figure 2:
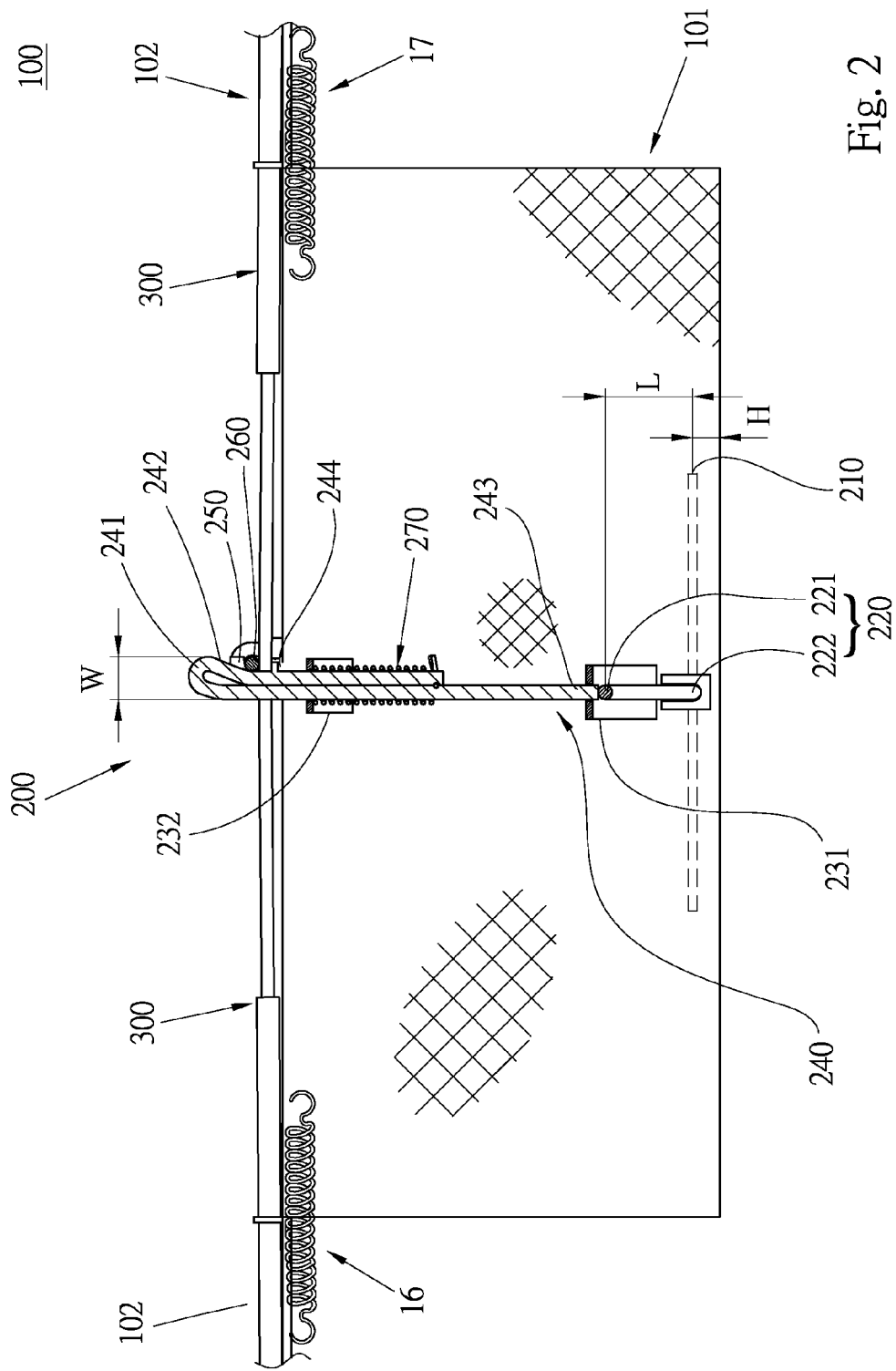
FIG. 2 is a side view according to FIG. 1.

Details are described below and referring to FIG. 2.

The cage structure 101, the pedal 210 and the cage door 102 are able to be made of mesh or solid panels according to the habit and nature of the wanted animals. In this embodiment, these parts are made of mesh panels.

With respect to FIG. 3, the pedal 210 pivotally connected to the cage structure 101 via a central axle 211 thereof; the pedal 210 tilts corresponding to the rotation of the central axle 211. Before catching animals, the pedal 210 is set to parallel with a bottom face of the cage structure 101 and keeps balance at a suspension distance H, referring in FIG. 4.

The rotation member 220 is arranged at a lateral side of the cage structure 101 and connected to the central axle 211 of the pedal 210. The rotation member 220 includes a trigger section 221 and an extension section 222. The trigger section 221 spaces a distance L from the central axle 211 of the pedal 210 and is parallel with the central axle 211 of the pedal 210. The extension section 222 stretches upwards or downwards from the central axle 211 of the pedal 210 to connect the trigger section 222. In this embodiment, the extension section 222 stretches upwards. The trigger section 221 is of angular displacement same as the pedal 210, so that the trigger section 221 moves annularly as the pedal 210 tilts. The extension section 222 is treated as a swinging radius. The trigger section 221, as in FIG. 4, has an acute edge 223 contacting the operation rod 240 for highly sensibility.

The capture cage further includes two bearing members 280 arranged by lateral sides thereof. The two bearing members 280 are disposed to two lateral sides of the bottom face of the cage structure 101 or to two side faces of the cage structure 101. Two ends of the central axle 221 of the pedal 220 rest on the two bearing members 280 for rotation. In this embodiment, the two bearing members 280 are disposed to two lateral sides of the bottom face of the cage structure 101; one bearing member 280 has a hole 281 and the other one has a recess 282. The rotation member 220 is set at one end of the pedal 210. The extension section 222 is arranged over the recess 282; the other end of the pedal 210 has a pivot section 212 through the hole 281. Therefore, the pedal 210 pivotally connects the cage structure 101 via the central axle 211 thereof, and the pedal 210 is able to swing about the central axle 211 thereof.

The restriction component 230 is used for restraining the operation rod 240 moving along the cage structure 101 in an up-and-down manner. The restriction component 230 could be one single member or a structure combined by several parts. In this embodiment, the restriction component 230 includes upper and lower restriction members 231, 232 arranged at the lateral side of the cage structure 101, same as the rotation member, in the up-and-down manner. Each restriction member defines a passage in order to allow the operation rod 240 to penetrate therein and to move upwards and downwards along the cage structure 101.

Figure 6:
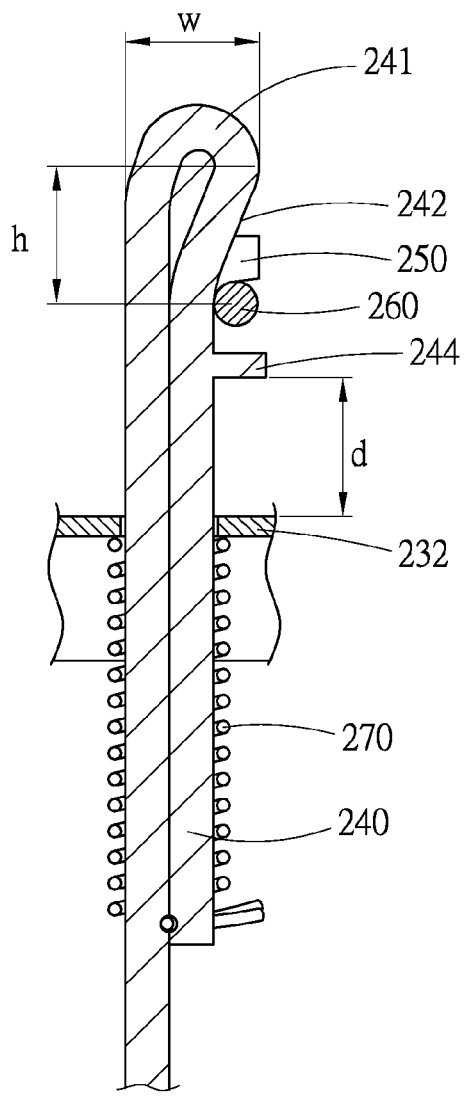
FIG. 6 is a side view of FIG. 5.

The operation rod 240 includes a head portion 241 at a top end thereof, a retaining face 242 being capable of laterally pushing the operation rod 242, and a bottom end 243. Referring to FIGS. 5, 6, the head portion 241 and the retaining face 242 are set over the upper restriction member 232. The head portion 241 is of an extreme width w, and width of the retaining face 242 shrinks form the head portion 241. The passage of the upper restriction member 232 is at least narrower than the extreme width w if the head portion 241, so that the head portion 241 will be kept from moving downwardly. With respect to FIG. 2, the bottom end 243 of the operation rod 240 is supported by the trigger section 221 of the rotation member 221.

The suppression member 250 is arranged to the cage structure 101 at a relative position in immovable manner and adjacent to the operation rod 240. The suppression member 250 defines a lateral opening, which is at the side same as the retaining face 242 of the operation rod 240. The suppression member 250 is approximately inverted-L-shaped, and disposed on the upper restriction member 232 or the top face of the cage structure 101. In this embodiment, the suppression member 250 is set on the upper restriction member 232. The suppression member 250 includes a vertical section 251, and a suppression section 252 laterally extending from the vertical section 251. The lateral opening is formed by the vertical section 251 and the suppression section 252. A free end of the induction lever 260 is kept in the lateral opening and repressed by the suppression section 260.

The induction lever 260 defines an end pivotally jointed to the top face of the cage structure 101, a pivot end 261, and the opposite end swing for free, the free end 262. Referring to FIGS. 1, 2, the cage structure 101 is further equipped with two springs 103 at the opening thereof to link to the cage door 102. The elastic energy of the spring 103 offers the cage door 102 instant enclosure. When the cage door 102 is forced to enclose the cage structure 101 by the springs 103, the bolt component 300 of the cage door 102 will lift the induction lever 260 so that the free end 262 of induction lever 260 abuts against the suppression section 252 of the suppression member 250 for holding the cage structure 101 with the cage door 102 open.

The pivot end 261 of the induction lever 260 is pivotally jointed to a limit fulcrum 263, defined on the top face of the cage structure 101. The limit fulcrum 263 offers at least one degree of the freedom, which allows rightward-and leftward movement, for release of the inducible member or bolt component 300. Referring to FIG. 5, the limit fulcrum 263 is a ring disposed of the top face cage structure 101, and the pivot end 261 of the induction lever 260 hooks the ring of the limit fulcrum 263. Thus, the limit fulcrum 263 here offers two degrees of the freedom, rightward-and leftward and upward-and downward movements. For details of the degrees of the freedom, here it is. After the induction lever 260 removes away from the suppression member 250 and moves in rightward-and leftward swing due to law of inertia, which is the first degree of the freedom. At the same time, the bolt component 300 lifts away the induction lever 260, and the induction lever 260 moves in upward-and downward swing due to law of action and reaction, which is the second degree of the freedom.

The resilient member 270 is arranged at the lateral side of the cage structure 101, same as the operation rod 240. The resilient member 270, which is of elastic energy, connects to the operation rod 240 for keeping the downward movement. Referring to FIGS. 5, 6, in this embodiment, the operation rod 240 sleeves onto the operation rod 240; a bottom end of the resilient member 270 joints to the operation rod 240 and a top end thereof abuts against the upper restriction member 232.

Figure 7:
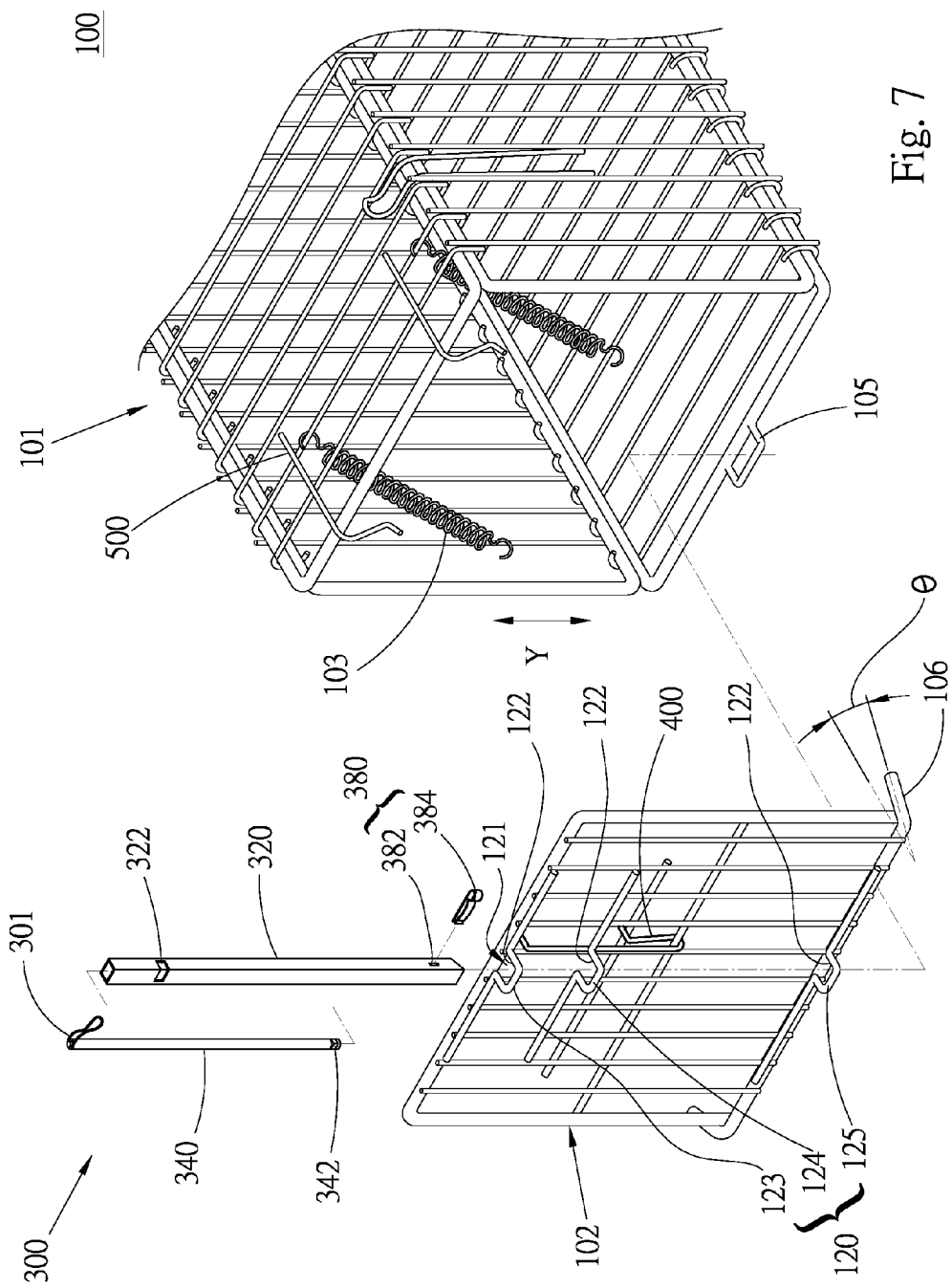
FIG. 7 is an enlarged perspective view of the cage door according to FIG. 1.

With respect to FIG. 7, the bolt component 300 includes an outer bar 320 being hollow, and an inner bar 340 received in the outer bar 320 and being movably relative to the outer bar 320. An external diameter of a bottom end of the inner bar 340 is larger than an internal diameter of a top end of the outer bar 320 to prevent the inner bar 340 from escaping from the top end of the outer bar 320. A bottom end of the outer bar 320 is defines as a slant face, which is of a lower front and a higher rear. In this embodiment, the inner bar 340 has a projection portion 342 protruded radically and outwardly from the bottom end thereof; the outer bar 320 has a bump portion 322 protruded inwardly to correspond to the projection portion 342 for restricting each other, so that the escape of the inner bar 340 from the outer bar 320 is prevented. The bolt component 300 includes a stop member 301 arranged on the top end of the inner bar 340, the stop member 301 blocks the inner bar 340 from withdrawing into the outer bar 320 and exposes at a top of the chute 121, so that the stop member 301 prevents the inner bar 320 from hiding inside the outer bar 320. In addition the configurations of the outer and inner bars 320, 340 correspond to each other. For example, the outer bar 320 is rectangular hollow, and the cross-sectional profile of the inner bar 340 is rectangular correspondently. The bump portion 322 of the outer bar 320 is set at a respective side relating to the projection portion 342 of the inner bar 340. In another way, the bump portion 322 of the outer bar 320 or the projection portion 342 of the inner bar 340 could be circle-shaped for the substantial block.

Before capture of animals, the cage door 102 is open; the bolt component 300 of the cage door 102 is stretched and confined by the induction lever 260 at the top of the cage structure 101. The induction lever 260 is restrained by the suppression member 250 and is corresponding to the retaining face 242 of the operation rod 240 under the head portion 241 thereof. Referring FIG. 6, the lateral opening of the suppression member 250 is lower than the extreme width w of the head portion 241 of the operation rod 240. At that time, the pedal 210 keeps balance for suspension while the trigger section 221 of the rotation member 220 supports the bottom end 243 of the operation rod 240. Therefore, the cage door 102 is kept open.

Figure 8:
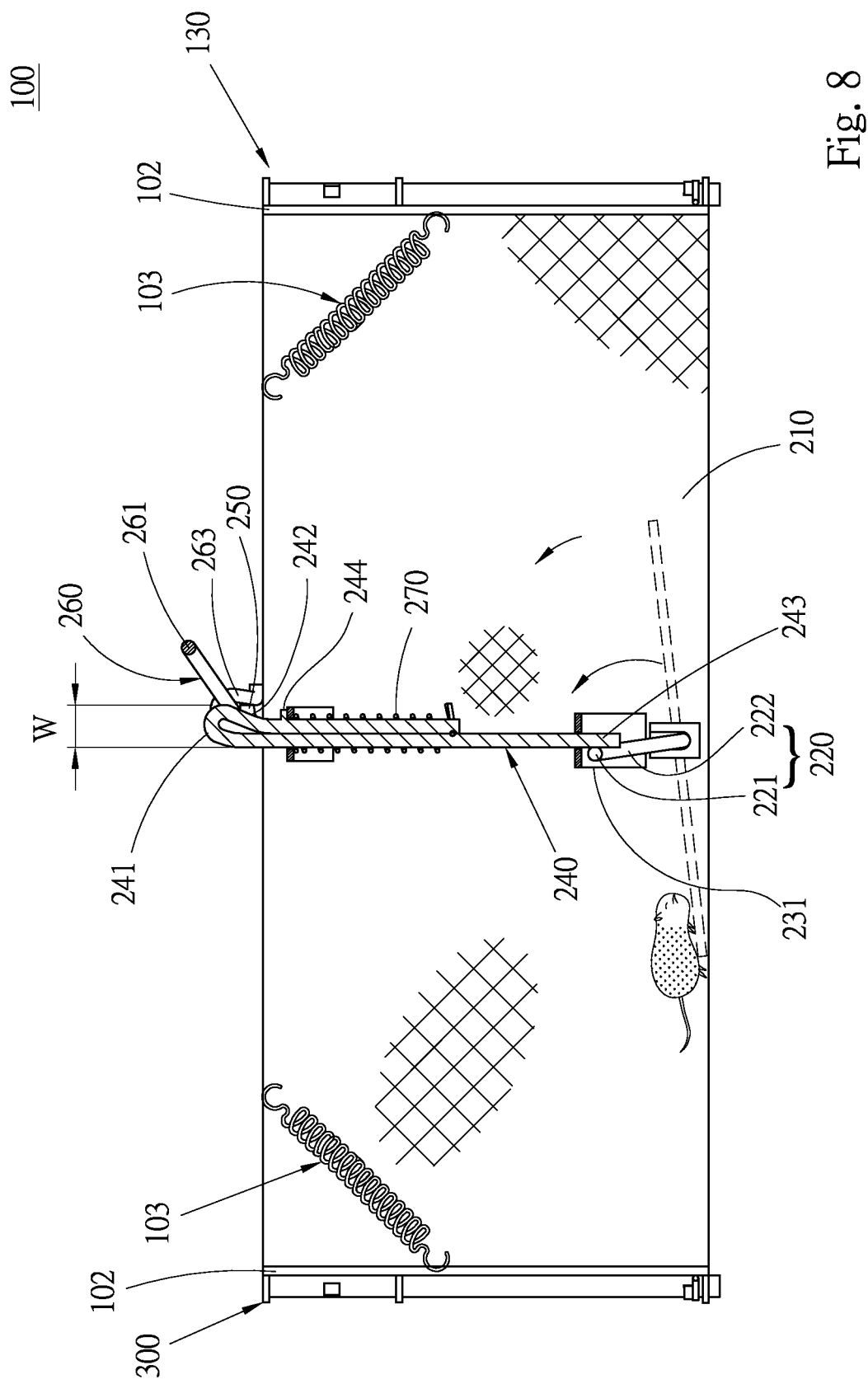
FIG. 8 is a side view illustrating the capture cage in enclosure status according to FIG. 1.

With respect to FIG. 8, when animals come to touch the pedal 210 and the pedal 210 is tilted, the trigger section 221 of the rotation member 220 moves away from the operation rod 240 because of the same angular displacement between the trigger section 221 and the pedal 210. The head portion 241 of the operation rod 240 moves downwardly and pushes the free end 261 of the induction lever 260 away from the suppression member 250 gradually, as in FIG. 9, while the operation rod 240 moves downwardly due to the downward force by the resilient member 270. The bolt component 300, as in FIG. 10, is released thereby, the cage door 102 encloses the cage structure 101 correspondingly, and the bolt component 300 is withdrawn in the chute 121 to bolt into the latch portion 105 of the cage structure 101 so that the cage door 102 latches to the cage structure 101, as in FIG. 11.

The pedal 210 of the capture cage 100 according to the present invention is stepped by animals; no matter which end of the pedal 210 is tilted, the chain reactions are actuated.

For details and embodiments of the bolt component 300, here are descriptions below.

The cage door 102 includes two lateral guides 106 extending two lateral sides thereof and being symmetrical, so that the lateral guides 106 simultaneously touch the two side faces of the cage structure 101 and the chute 121 aligns with the latch portion 105 of the cage structure 101 while the cage door 102 encloses the cage structure 101. The lateral guides 106 provides guiding function for highly precision and efficiency of enclosure. Furthermore, the slant face of the bottom end of the bolt component 300 helps a smooth latch into the latch portion 105 of the cage structure 101.

The cage door 102 includes a rack member 120 at the outer face thereof, and the chute 121 is defined on the rack member 120. The rack member 120 is defined at least by two U-shaped components, which are disposed on the cage door 102 in an up-and-down manner. Each U-shaped component defines a through passage 122, and the through passages 122 are to form the chute 121. Referring FIGS. 7 and 10, the bolt component 300 includes an obstruction portion 380; and the cage door 102 defines at least one halt point. The obstruction portion 380 is blocked at the halt point to ensure the bottom end of the bolt component 300 not over access the latch portion 105 of the cage structure 101. The configuration and position of the obstruction portion 380 and the halt point are not restrained.

In this embodiment, these U-shaped components are defined as first and second U-shaped components 123, 124 disposed near top and bottom edges of the cage door 102, and a third U-shaped component 125 adjacent to the first one 123. The obstruction portion 380 of the bolt component 300 is set between the second and third U-shaped components 124, 125. Between the second and third U-shaped components 124, 125, a slide distance is set for the bolt component 300, and the second U-shaped component 124 is taken as the halt point. When the bolt component 300 slides toward the top end of the chute 121, the obstruction portion 380 of the bolt component 300 approaches until blocked at the third U-shaped component 125, the bolt component 300 is prevented from escaping from the chute 121. When the bolt component 300 withdraws into the chute 121 the stop member 301 abuts against the first U-shaped component 123, and the obstruction portion 380 abuts against the second U-shaped component 124.

Figure 11:
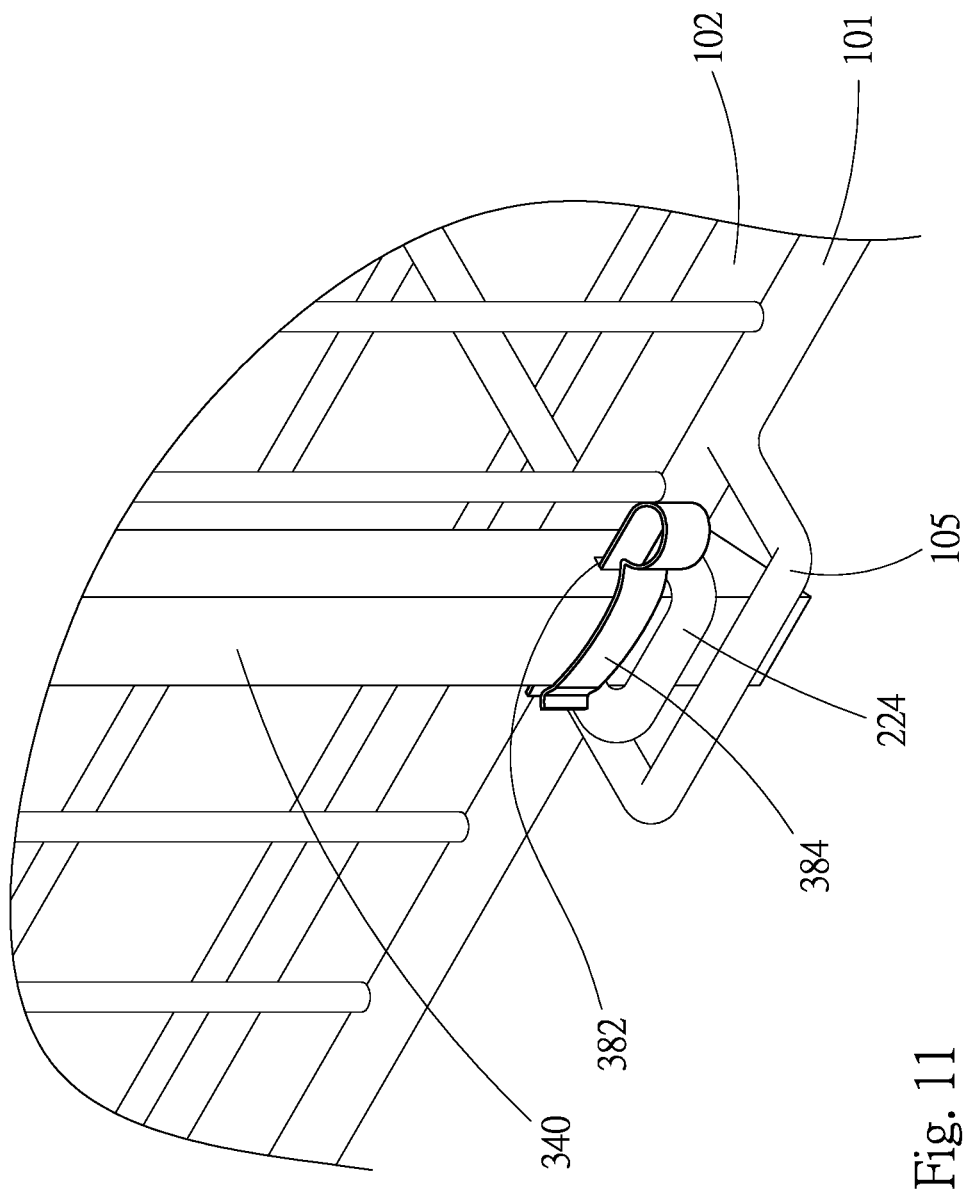
FIG. 11 is an enlarged perspective view of the cage door in enclosure status according to FIG. 8.
Figure 12:
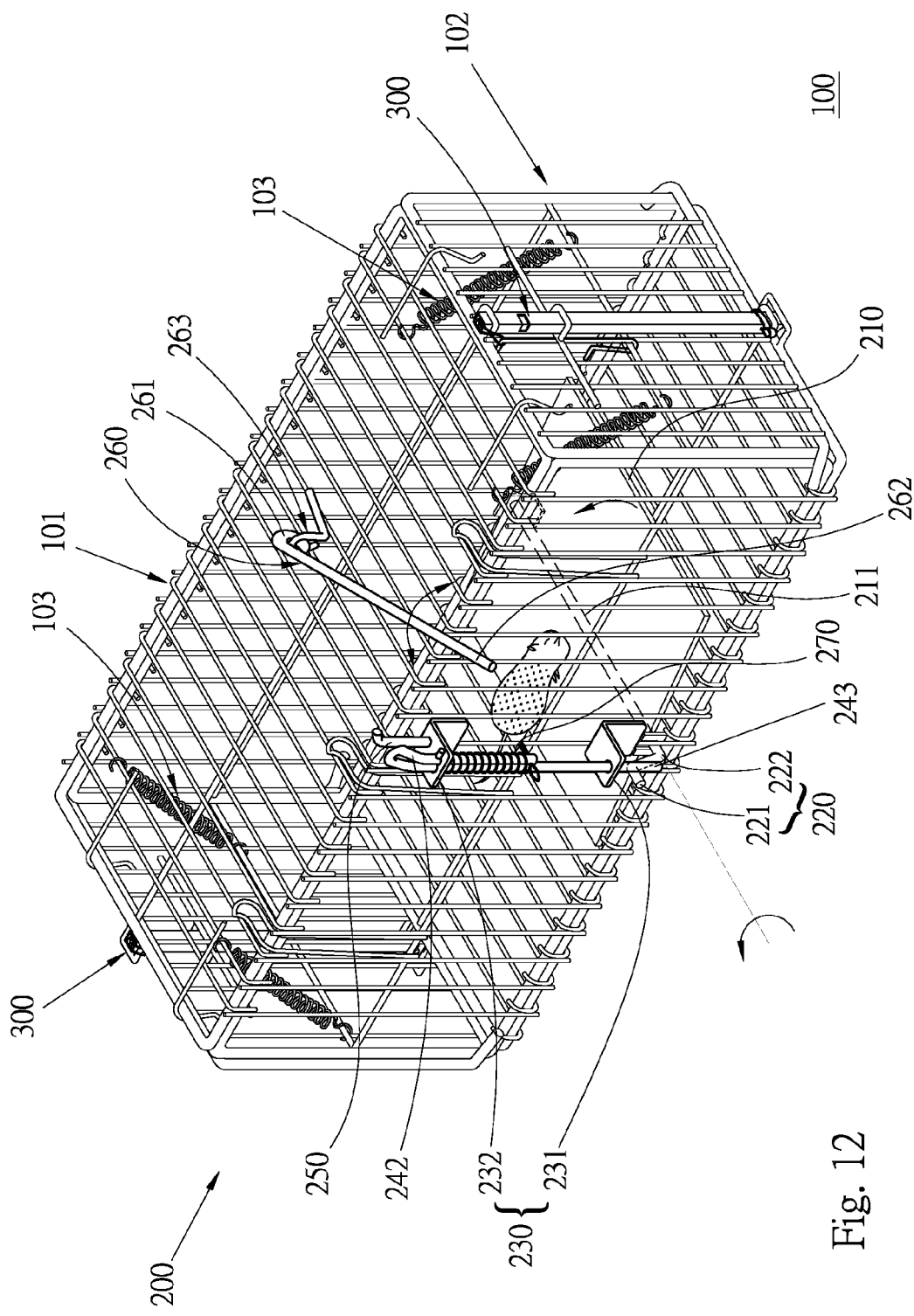
FIG. 12 is a perspective view illustrating the capture cage in enclosure status according to FIG. 8.

With respect to FIGS. 11 and 22, the obstruction portion 380 of the bolt component 300 is defined by a penetration hole 382 formed thereof, and a pin 384 passing through the penetration hole 382. The position of the penetration hole 382 is not restrained. The pin 384 defines two shrunk sections 386 by the lateral sides of the position of the penetration hole 382 of the bolt component 300, so that the pin 384 clamps with the penetration hole 382. In this embodiment, the penetration hole 382 is formed by the bottom end of the outer bar 320, and the pin 384 is a sheet. The two shrunk sections 386 are wave-liked. The obstruction portion 380 is formed by setting the penetration hole 382 and the pin 384 on the outer bar 320 as a protrusion thereof.

A buckle member 400 elastically hooks the stop member 301 of the bolt component 300 to secure the enclosure strength of the cage structure 101. Referring to FIGS. 10 and 21, the cage door 102 has several of posts 107, 108, 109 parallel in order; the posts 107, 108, 109 are at inner and outer faces of the cage door 102 in a stagger manner. The buckle member 400 is arranged on the cage door 102 along the up-and-down direction, and is a pole-liked. The buckle member 400 has a bottom section, which is defined as a bottom end 402 thereof, bended to clasp with the post 109 of the cage door 102. A first end of the buckle member 400 stretches upwardly and bend to form a bend end 406 for hooking the post 108 over the one 109. A second end of the buckle member 400 stretches upwardly to form a post body 440, which is sandwiched by two posts 107, 108 for being secured. A distal of the post body 440 of the buckle member 400 further bends to be a bend portion 420, which is defined as a top end of the buckle member 400. The bottom end 402 of the buckle member 400 connects to the cage door 102, the bend portion 420 of the buckle member 400 hooks the stop member 301, so that the cage door 102 is ensured to secure to the cage structure 102.

Figure 9:
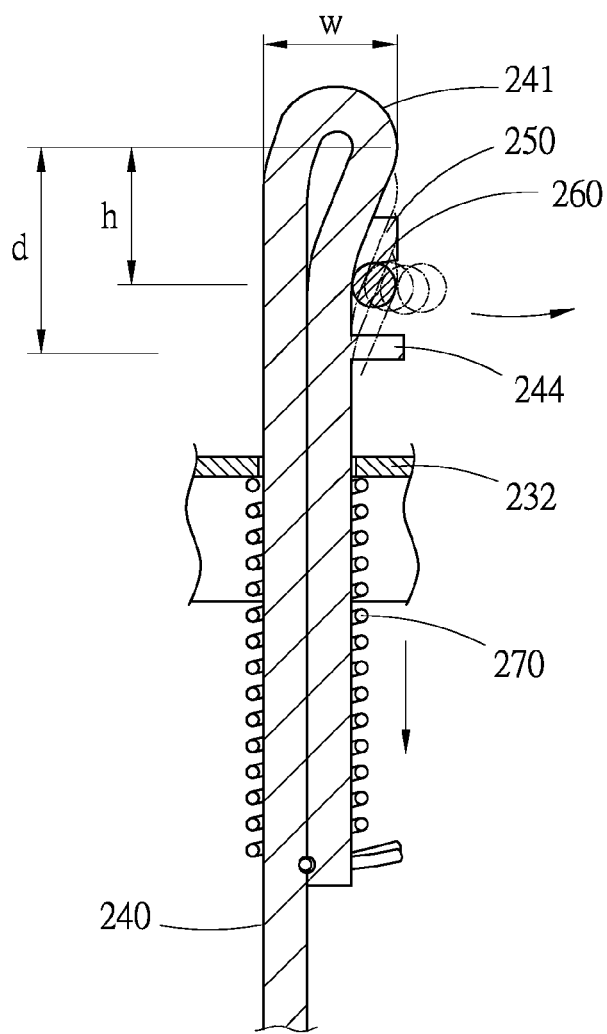
FIG. 9 is a side view illustrating the operation rod gradually pushing the induction lever away according to FIG. 1.
Figure 13:
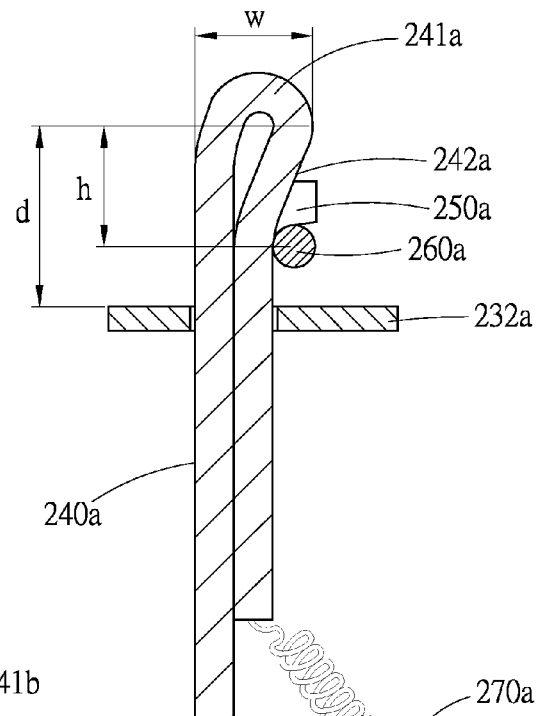
FIGS. 13 to 15 are side views illustrating various embodiments of the operation rod and the resilient member according to the present invention.
Figure 14:
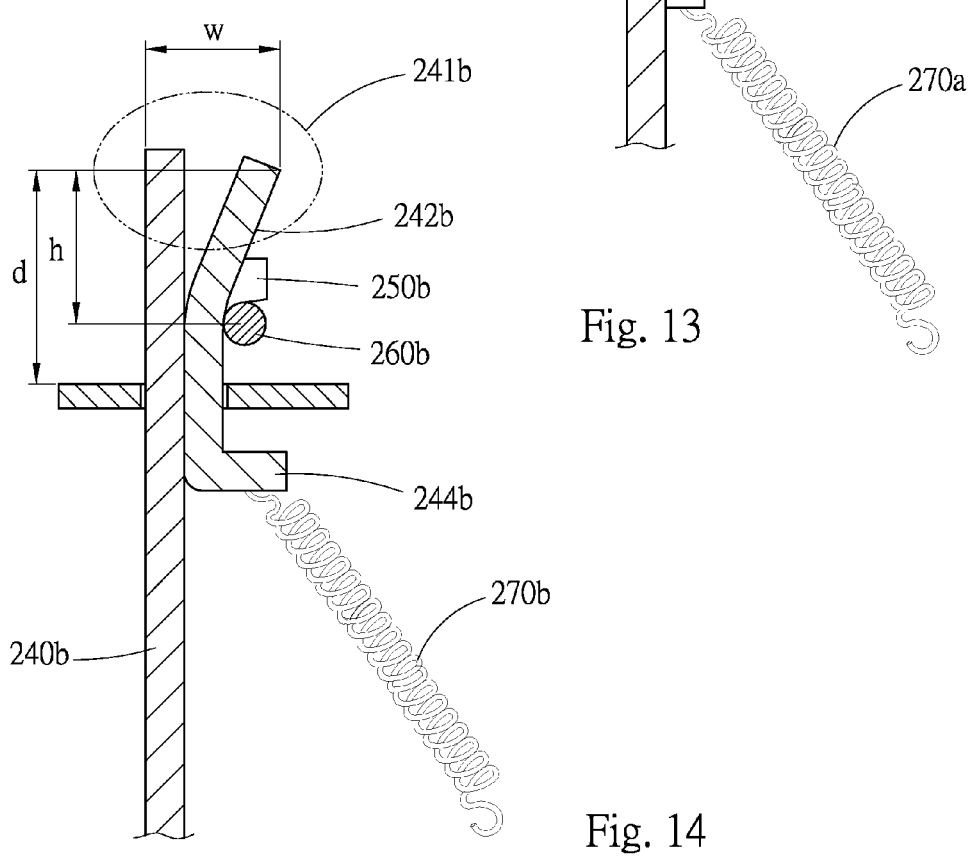
Figure 15:
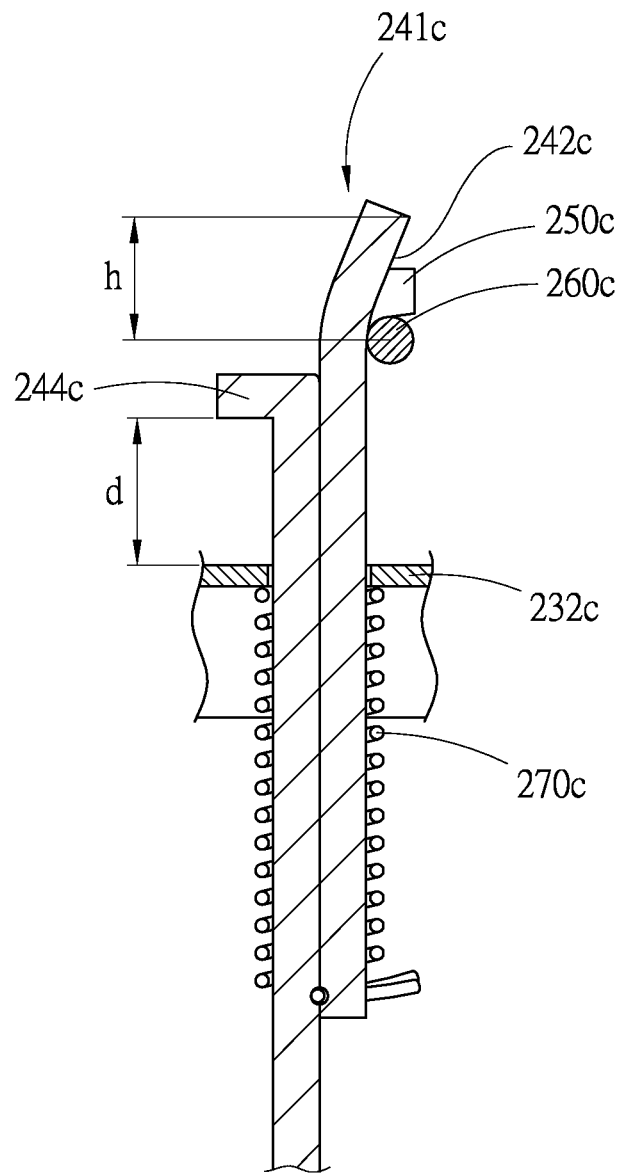

For further embodiments of the operation rod, here are descriptions below. The operation rod is designed to moves in a trigger distance d, which ensures the head portion to push the induction lever away. Referring to FIGS. 6 and 9, a first embodiment of the operation rod 240 is disclosed. The head portion 241 is formed by the rod retroflexed to form the extreme width w. The operation rod 240 includes a stop portion 244 extended laterally therefrom and is set over the upper restriction member 232. The distance between the stop portion 244 and the upper restriction member 232 is taken as the trigger distance d. The stop portion 244 is not limited to abut against the upper restriction member 232, and is used for moving along the cage structure 101. Referring to FIG. 13, a second embodiment of the operation rod 240 is disclosed. The distance between the position of the extreme width of the head portion 241a and the upper restriction member 232a is taken as the trigger distance d. The resilient member 270a is set at the same side with the operation rod 24a. An end of the resilient member 270a connects to operation rod 240a, and the other end thereof connects to a side of cage structure 101. The resilient member 270a keeps the operation rod 240a moving downwardly. Referring FIG. 14, the head portion 241b is formed by welding the inclined bar together, and a stop portion 244b is set below the upper restriction member 232b and extended from the free end of the inclined bar or the rod body. At that time, the distance between the head portion 241b and the upper restriction member 232b is taken as the trigger distance d. Referring FIG. 15, the head portion 241b is formed by welding the inclined pole and a stop portion 244c is set over the upper restriction member 232c and extended from the free end of the rod body At that time, the distance between the stop portion 244c and the upper restriction member 232b is taken as the trigger distance d. The trigger distance d is appropriately longer than a vertical distance of the retaining face to ensure pushing the induction lever away.

For further arrangements of the operation rod, suppression member and limit fulcrum, here are descriptions below.

With respect to FIG. 16, the upper restriction member 232d is set on the top of the cage structure 101; the suppression member 250d is adjacent to the operation rod 240d and the upper restriction member 232d. The pivot end 261d of the induction lever 260d joins to the limit fulcrum 263d. The free end 262d and of the induction lever 260d is under the head portion 241d of the operation rod 240d and adjacent to the retaining face 242d of the operation rod 240d. The limit fulcrum 263d includes a ring, and a short bar extended through the ring and fixed on the top mesh panel. The arrangement of the retaining face 242d of the operation rod 240d, the suppression member 250d and the pivot end 261d of the induction lever 260d is appropriately lined. Referring to FIG. 17, the suppression member 250e is distanced far away from the induction lever 260e. The suppression member 250e includes a longer suppression section 252e. The operation rod 240d and the suppression member 250d are not necessary in order. The suppression member 250f, as in FIG. 18, is set outside the operation rod 240f, and the same effect is met thereby.

Figure 19:
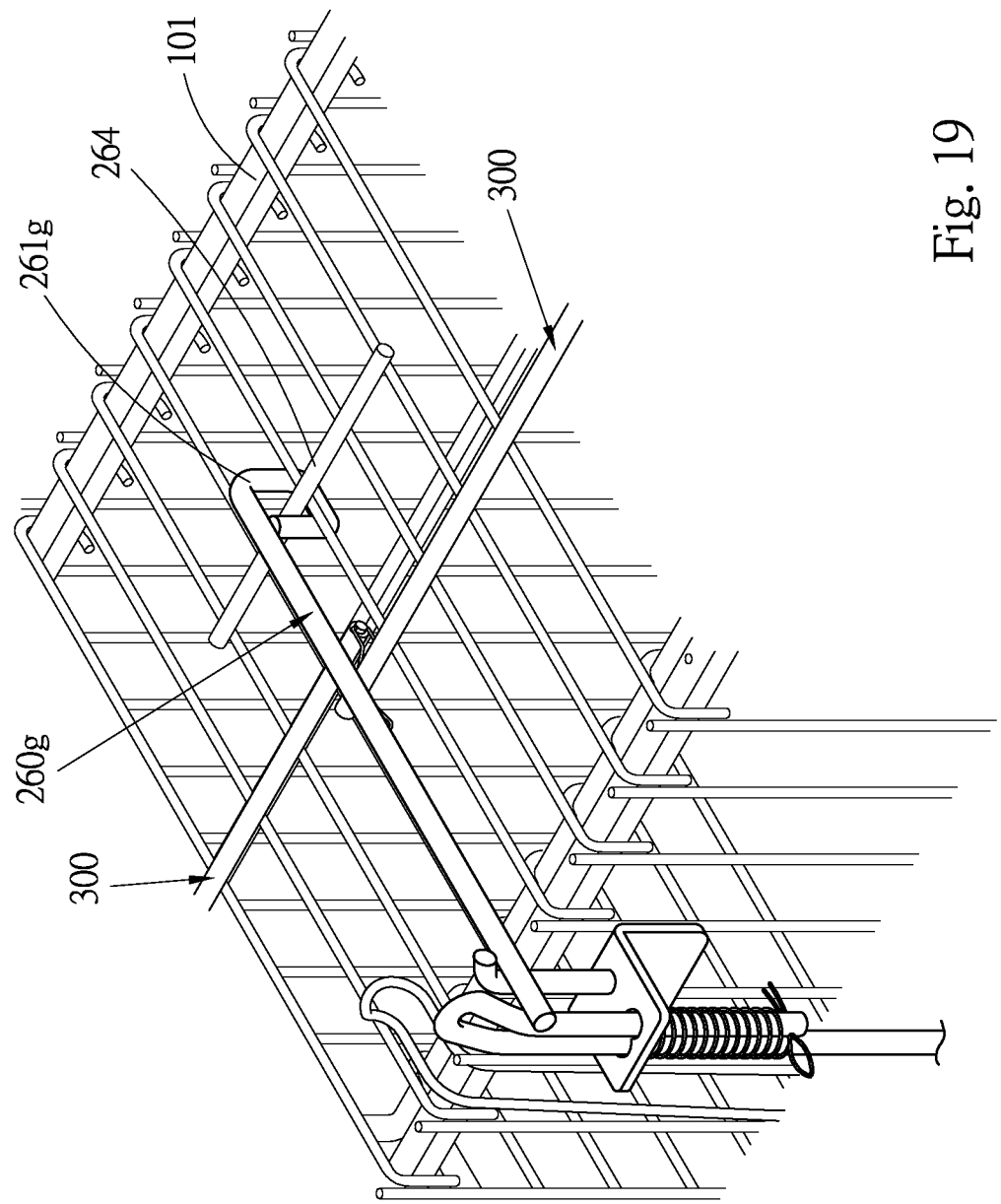

With respect to FIG. 19, a rod 264 is disposed of the top face of the cage structure 101 and perpendicular to a longitudinal direction of the induction lever 260g, when the induction lever 260g is engaging the suppression member. The end of the induction lever 260g defines an enclosed portion (annular portion 261g) confining the rod 264 so as to define as the limit fulcrum.

For further embodiments of the pedal, here are descriptions below.

Figure 20:
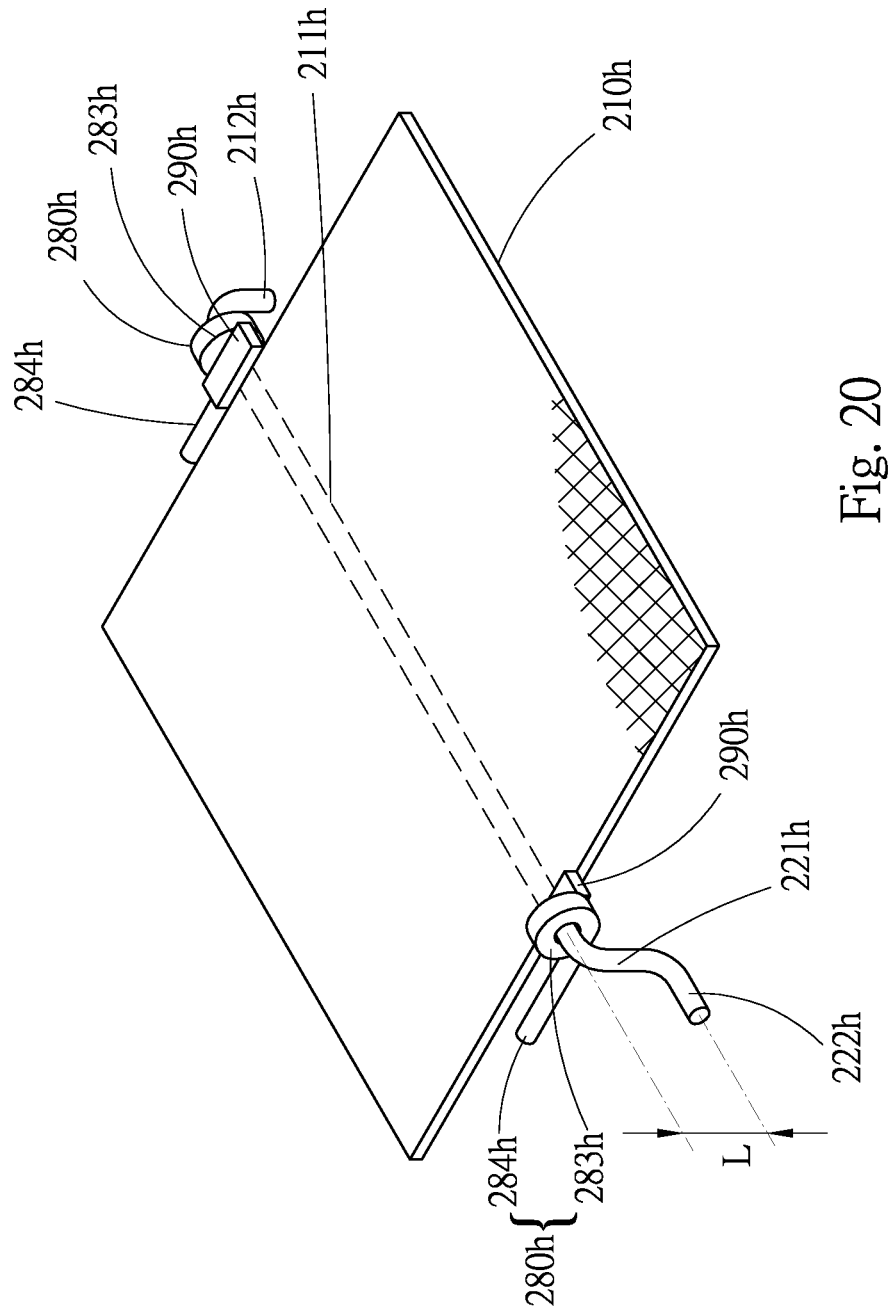
FIG. 20 is a perspective view illustrating another embodiment of the pedal according to the present invention.

With respect to FIG. 20, the cage structure 101 includes two bearing members 280h fixed to lateral sides of the cage structure 101. The two bearing members 280h are disposed to two side mesh panels of the cage structure 101. Each bearing member 280h includes a pivot portion 283h and an extension bar 284h. One end of the pedal 210h connects the rotation member 220h, and the extension section 222h passes through one pivot portion 283h; the another end of the pedal 210h defines a stretching section 212*h* passing the pivot portion 283*h*, to pivotally connect the pedal 210*h* to the cage structure 101. The two bearing members 280*h* are arranged inside or outside the two side faces of the cage structure 101; a gap is formed spacing from the pedal 210*h*. An ear portion 290*h* is arranged in the gap, so that a friction is created between the pedal 210*h* and the bearing member 280*h* or the pedal 210*h* and the side face of the cage structure 101 to keep the balance for the pedal 210*h*. The connection of the ear portion 290 is weld, and preferably a sheet. In addition, the embodiment of the ear portion is not restrained.

For further embodiments of the bolt component, here are descriptions below.

Figure 23:
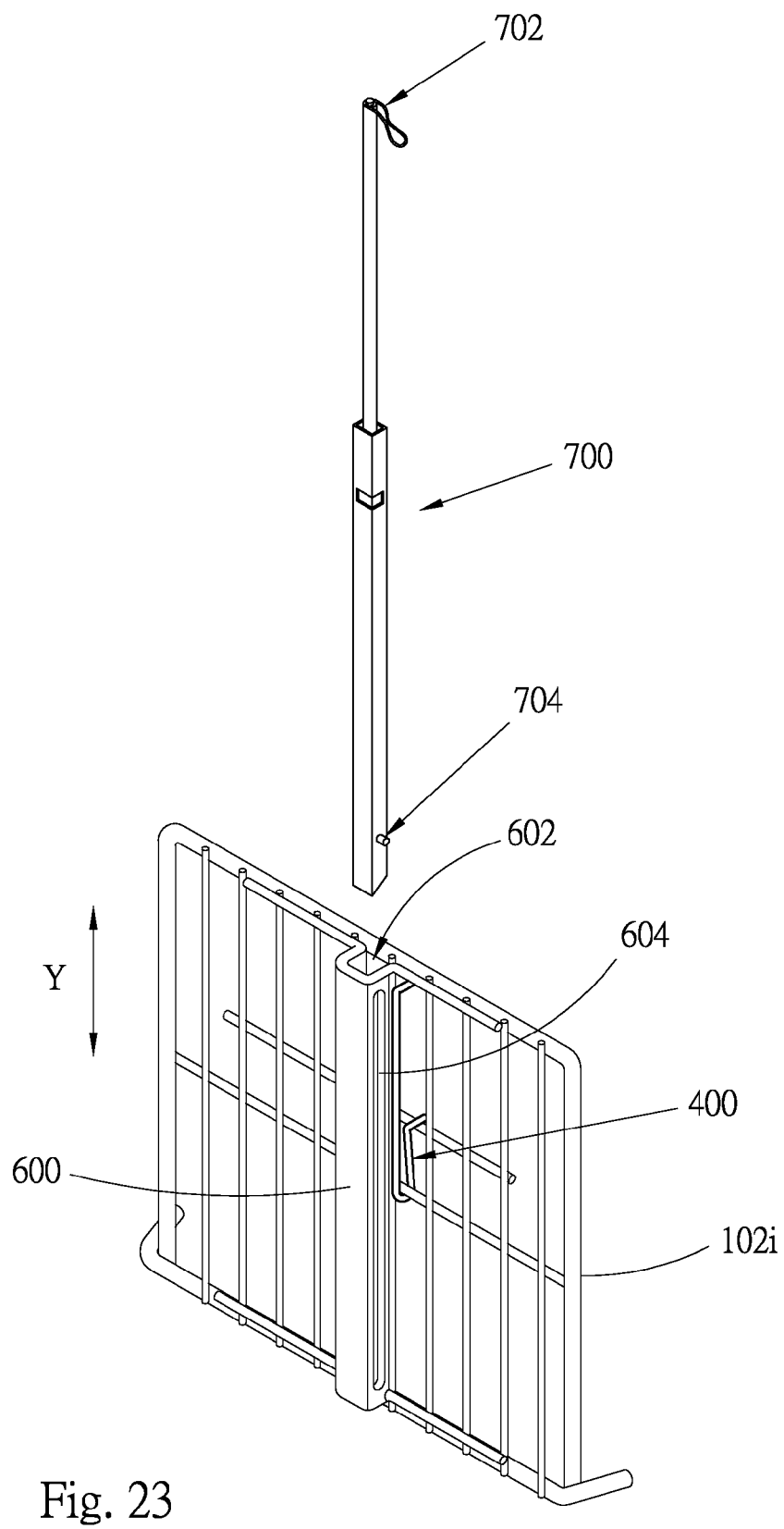
FIG. 23 is a perspective view of another embodiment of the cage door according to the present invention.

With respect to FIG. 23, a cage door 102*i* includes a rack member at the outer face thereof. The rack member is a casing being elongated, and a chute 602 is formed in the casing. The casing includes a side slit 604 communicating with the chute 602. A bolt component 700 includes a stop member 702 at a top end thereof, and an obstruction portion 704 at a bottom end thereof. The stop member 702 is circular, and the obstruction portion 704 is a short bar lateral extended from the bolt component 700. The obstruction portion 704 slides along the side slit 604, and the two ends of the side slit 604 define a slide distance. When the bolt component 700 slides toward the top end of the chute 602, the obstruction portion 704 abuts against the top end of the side slit 604. When the bolt component 700 slides toward the bottom end of the chute 602, the stop member 702 abuts against the casing 600 and the obstruction portion 704 abuts against the bottom end of the side slit 604. Therefore, the bottom end of the side slit 604 is defined as the halt point. The casing offers the chute for the bolt component 700 slide along therein.

Therefore, the capture cage according to the present invention is applied with the leverage principle and coaxial rotation, and is capable of highly sense of slight off-balance. The highly sense of slight off-balance of the capture cage is kept by triggering the pedal in order to enclose the cage structure with the cage door for confining animals therein. The problems of capture difficulties due to insufficient force, such as underweight animals or inappropriate touch of bail, are prevented thereby. The capture cage according to the present invention is also advantaged of economic costs due to easy install and simple structure. The capture cage according to the present invention, in which the bolt component could be withdrawn in the cage door while enclosure, takes less volume occupation during the capture process than the prior art and is benefit of delivery due to the reduced space after capture.

As for the highly sense of slight-off balance of the capture cage, there is no restriction for the installation, assembly and delivery per se. The capture cage is of guiding function for highly precision and efficiency of enclosure, in which the cage door latches with the cage structure in seconds to prevent from escape of the animals.

The above embodiments are only used to illustrate the present invention, not intended to limit the scope thereof. Many modifications of the above embodiments can be made without departing from the spirit of the present invention.

What is claimed is:

1. A capture cage, comprising:
 a cage structure having at least one end thereof, an opening formed at a corresponding end of the at least one end, a cage door pivotally connected to the opening for enclosure, an inducible member connected to the cage door and moving with the cage door as the cage door moves between an open position and a closed position;
 a pedal pivotally connected in the cage structure and being capable of titling;
 a rotation member located on a lateral side of the cage structure, and being connected to and moving with the pedal; wherein the rotation member includes a trigger section spaced a distance from a central axle of the pedal;
 an operation rod located on the lateral side of the cage structure and movable upwardly and downwardly along the lateral side of the cage structure, a resilient member pushing the operation rod in a downward direction; wherein the operation rod includes a head portion located at a top end thereof;
 a suppression member fixed to the cage structure and located adjacent to the operation rod, and
 an induction lever having a first end pivotally connected to a top face of the cage structure;
 wherein, when the cage structure is located in a first position, the cage door is open, the inducible member is confined by the induction lever, and a second end of the induction lever contacts and is restrained by the suppression member and is located adjacent to the head portion of the operation rod; correspondingly, the trigger section of the rotation member engaging and supporting a bottom end of the operation rod, and two opposing ends of the pedal are spaced apart from a bottom face of the cage structure;
 wherein, when the cage structure is located in a second position, the pedal is tilted, the trigger section of the rotation member moves away from the bottom end of the operation rod, the resilient member pushes the operation rod downwardly, the head portion of the operation rod pushes the second end of the induction lever away from the suppression member when the operation rod moves downwardly forced by the resilient member, the inducible member is released from the induction lever and the cage door encloses the corresponding end of the cage structure.

2. The capture cage according to claim 1, wherein the rotation member includes an extension section stretched upwards or downwards from the central axle of the pedal to connect the trigger section.

3. The capture cage according to claim 1, wherein the cage structure includes a ring, defined as a limit fulcrum, disposed on the top face thereof, and the first end of the induction lever hooks the ring of the limit fulcrum.

4. The capture cage according to claim 1, wherein the cage structure includes a rod located on the top face thereof and being positioned perpendicular to the induction lever when the cage structure is located in the first position, the first end of the induction lever has an annular portion, the rod is inserted into the annular portion of the induction lever so as to define a limit fulcrum.

5. The capture cage according to claim 1, further including a restriction component located on the lateral side of the cage structure, wherein the restriction component has a passage, the operation rod is inserted into the passage and is movable upwardly and downwardly along the cage structure.

6. The capture cage according to claim 5, wherein the resilient member sleeves onto the operation rod, and defines two ends, one end connects to the operation rod and the other end abuts against the restriction member.

7. The capture cage according to claim 5, wherein the operation rod further includes a stop portion extended laterally therefrom to keep the operation rod in the restriction component while moving upwards and downwards along the cage structure.

8. The capture cage according to claim 5, wherein the restriction component is disposed at the top face or a side face.

9. The capture cage according to claim 8, wherein the suppression member is disposed on the restriction component or the top face of the cage structure.

10. The capture cage according to claim 1, further including two bearing members arranged by lateral sides of the cage structure; wherein the two bearing members are disposed to two lateral sides of the bottom face of the cage structure or to two side faces of the cage structure; two ends of the central axle of the pedal rest on the two bearing members for rotation.

11. The capture cage according to claim 1, wherein the cage structure has a latch portion formed of a bottom edge at the opening thereof; the cage door defines a chute formed at an outer face thereof in an up-and-down manner; the inducible member is a bolt component, which arranged through and slides in the chute; a bottom end of the bolt component is restrained in the chute as the bolt component slides outwards from a top end of the chute; whereby the bolt component is withdrawn in the chute to bolt into the latch portion of the cage structure so that the cage door latches to the cage structure.

12. The capture cage according to claim 11, wherein the bolt component includes an outer bar being hollow, and an inner bar received in the outer bar and being movably relative to the outer bar; a bottom end of the outer bar is restrained in the chute; an external diameter of a bottom end of the inner bar is larger than an internal diameter of a top end of the outer bar to prevent the inner bar from escaping from the top end of the outer bar.

13. The capture cage according to claim 12, wherein the inner bar has a projection portion protruded radically and outwardly from the bottom end thereof; the outer bar has a bump portion protruding inwardly, the projection portion of the inner bar and the bump portion of the outer bar preventing the inner bar from separating from the outer bar.

14. The capture cage according to claim 12, wherein the bolt component includes a stop member located on a top end of the inner bar, the stop member limits a distance the inner bar moves into the outer bar.

15. The capture cage according to claim 12, wherein the bolt component includes an obstruction portion; and the cage door defines at least one halt point; the obstruction portion is blocked at the halt point limiting a distance the bottom end of the bolt component is inserted into the latch portion of the cage structure.

16. The capture cage according to claim 15, wherein the obstruction portion is a short bar extended lateral from the bolt component.

17. The capture cage according to claim 15, wherein the obstruction portion of the bolt component is defined by a penetration hole and a pin; the pin passes through the penetration hole.

18. The capture cage according to claim 15, wherein the cage door includes a rack member at the outer face thereof, and the chute is defined on the rack member; the rack member is defined at least by two U-shaped components, which are disposed on the cage door in an up-and-down manner; each U-shaped component defines a through passage, and the through passages are to form the chute; the obstruction portion of the bolt component is set between the two U-shaped components.

19. The capture cage according to claim 15, wherein the cage door includes a rack member at the outer face thereof; the rack member is a casing being elongated, and the chute is formed in the casing; the casing includes a side slit communicating with the chute and formed at the same side with the obstruction portion so that the obstruction portion sliding along the side slit.

20. The capture cage according to claim 11, wherein the cage door includes two lateral guides extending two lateral sides thereof and being symmetrical, so that the lateral guides simultaneously touch the two side faces of the cage structure for the chute aligning with the latch portion of the cage structure as the cage door encloses the cage structure.

* * * * *